United States Patent
Tareilus et al.

(10) Patent No.: US 6,239,566 B1
(45) Date of Patent: May 29, 2001

(54) DRIVE SYSTEM FOR A PERMANENTLY EXCITED ELECTRIC MOTOR HAVING AT LEAST ONE PHASE WINDING

(75) Inventors: Alfred Tareilus, Schweinfurt; Alfred Rüthlein, Sennfeld; Erich Karg, Zeitlofs, all of (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/311,191

(22) Filed: May 12, 1999

(30) Foreign Application Priority Data

May 12, 1998 (DE) .............................. 198 20 975
Aug. 6, 1998 (DE) .............................. 198 35 576

(51) Int. Cl.[7] .................. H02H 7/09; H02P 6/24
(52) U.S. Cl. ............................. 318/379; 318/500
(58) Field of Search .................. 318/138, 254, 318/293, 379, 380, 434, 439, 700, 720, 721, 722, 724, 500; 388/903

(56) References Cited

U.S. PATENT DOCUMENTS

| 4,532,461 | * | 7/1985 | Crook | 318/254 |
| 4,623,826 | * | 11/1986 | Benjamin et al. | 318/254 |
| 4,710,841 | | 12/1987 | Bottrell | 361/23 |
| 5,495,372 | | 2/1996 | Bahlamann et al. | 360/75 |
| 5,682,089 | | 10/1997 | Bolte et al. | 318/439 |
| 5,760,555 | * | 6/1998 | Yamano et al. | 318/293 |
| 5,782,610 | * | 7/1998 | Ikeda | 318/254 X |
| 5,914,582 | * | 6/1999 | Takamoto et al. | 318/801 |

FOREIGN PATENT DOCUMENTS

| 0 704 961 A1 | 4/1996 | (EP) | H02P/3/06 |
| 0 301 737 A2 | 2/1998 | (EP) | G11B/19/20 |
| 2 207 569 | 12/1987 | (GB) . | |
| 2 328 331 | 2/1999 | (GB) | H02P/7/00 |
| 55-34806 | 3/1980 | (JP) | H02P/6/00 |
| 62-178194 | 8/1987 | (JP) | H02P/7/29 |
| 1-194885 | 8/1989 | (JP) | H02P/6/02 |
| 3-112392 | 5/1991 | (JP) . | |
| 4-317582 | 11/1992 | (JP) | H02P/6/02 |
| 5-137377 | 6/1993 | (JP) | H02P/6/02 |
| 5-252790 | 9/1993 | (JP) | H02P/6/02 |
| 5-236791 | 10/1993 | (JP) | H02P/6/02 |
| 6-86587 | 3/1994 | (JP) | H02P/6/02 |
| 6-98585 | 4/1994 | (JP) | H02P/6/02 |
| 6-233582 | 8/1994 | (JP) | H02P/6/02 |
| 6-253585 | 9/1994 | (JP) | H02P/6/02 |
| 6-261588 | 9/1994 | (JP) | H02P/6/02 |
| 8-336292 | 6/1995 | (JP) . | |
| 7-184390 | 7/1995 | (JP) . | |
| 9-23683 | 1/1997 | (JP) | H02P/6/06 |
| 9-172703 | 6/1997 | (JP) | B60L/9/18 |
| 10-15278 | 1/1998 | (JP) | D06F/33/02 |

* cited by examiner

Primary Examiner—Bentsu Ro
(74) Attorney, Agent, or Firm—Cohen, Pontani, Lieberman & Pavane

(57) ABSTRACT

A drive system for a permanently excited electric motor having at least one phase winding including a half-bridge arrangement for each phase winding of the motor, an intermediate circuit connecting each half-bridge arrangement to a motor supply voltage source, and a drive arrangement for driving each half-bridge arrangement. In accordance with the driving via the drive arrangement, a voltage or a potential with a predetermined polarity is applied or can be applied for a predetermined duration by each half-bridge arrangement to that phase winding of the electric motor which is assigned to this half-bridge arrangement. An operating state registering arrangement registers an operating state of the drive system and/or of the electric motor, where the drive arrangement is designed such that, when the presence of at least one predetermined operating state in the drive system and/or in the electric motor is registered by the operating state registering arrangement, a command is generated to produce a short circuit between each terminal of the motor.

7 Claims, 3 Drawing Sheets

DRIVE SYSTEM FOR A PERMANENTLY EXCITED ELECTRIC MOTOR HAVING AT LEAST ONE PHASE WINDING

BACKGROUND OF THE INVENTION

1. Field of the Invention

The present invention relates to drive systems for electric motors and, more particularly, to a drive system for a permanently excited electric motor.

2. Description of the Related Art

Permanently excited electric motors are used, for example, as vehicle drive motors which, in the case of hybrid drive systems, receive electrical power from a generator driven by an internal combustion engine or, in the case of completely electrically operated vehicles, receive electrical power from a so-called traction battery. In the case of permanently excited electric motors, and due to their construction, there is, in principle, the problem that, on account of the relative movement which occurs during operation between the armature windings and the permanent magnets, a back e.m.f., known as the field e.m.f., is induced in the armature windings. This induced voltage rises as the speed increases, until it ultimately lies in the range of the supply voltage provided by the voltage source for the electric motor. A further increase in the motor speed can then be obtained only by means of so-called field weakening, in which a phase-winding shift in the current introduced into the windings is produced. If faults occur in such drive systems with permanently excited electric motors, such as the failure of the drive unit performing the field weakening, this may lead to serious problems. As can be taken from characteristic curve A in FIG. 3, which reproduces the braking torque for a permanently excited electric motor in the case of passive regeneration by the rotating electric motor, a failure of the field weakening, in particular at high speeds, leads to a considerable braking torque, which is produced when electrical energy is fed back from the motor into the voltage source, for example the traction battery. Due to the voltage overshoot caused by the internal resistance of the battery, there is the risk that damage will occur in the area of the traction battery, which is generally designed to output an operating voltage of about 200 to 300 V. In addition, the occurrence of such large braking torques during driving operation is undesirable, since this may result in endangering a person seated in a vehicle.

If no voltage source is connected to the intermediate circuit, or if, for example, the connection between the voltage source and the intermediate circuit is broken, the field e.m.f. may be present on the intermediate circuit. This can lead to damage in the area of the components present in the intermediate circuit or the power electronics for the electric motor and/or possibly in a generator, in particular semiconductor components.

In order to avoid these problems, the various components of the converter, for example the capacitors and power semiconductors, have been designed such that even the rectified field e.m.f. does not exceed their rated voltage, so that damage to these components is not expected. The consequence of this is that the drive systems could not be designed such that they are able to produce the greatest possible output in the volume available to them and a certain oversizing of the components always had to be provided. In addition, the various components in the intermediate circuit or the power electronics had to be designed for the maximum voltages to be expected, so that higher costs arose in the area of these components.

SUMMARY OF THE INVENTION

It is therefore the object of the present invention to provide a drive system for a permanently excited electric motor having at least one phase winding which is suitable to take suitable measures for avoiding damage to components or for avoiding undesired consequences in the widest possible range of operating states, and in particular fault states.

According to the invention, this and other objects are achieved by a drive system for a permanently excited electric motor having at least one phase winding, comprising a half-bridge arrangement for each phase winding of the motor, an intermediate circuit connecting each half-bridge arrangement to a motor supply voltage source, a drive arrangement for driving each half-bridge arrangement, where, in accordance with the driving by means of the drive arrangement, a voltage or a potential with a predetermined polarity is applied or can be applied for a predetermined duration by each half-bridge arrangement to that phase winding of the electric motor which is assigned to this half-bridge arrangement, and an operating state registering arrangement at least for registering an operating state of the drive system and/or of the electric motor.

In the drive system according to the invention, the drive arrangement is designed such that, when the presence of at least one predetermined operating state in the drive system and/or in the electric motor is registered by the operating state registering arrangement, said drive arrangement generates a command to produce a short circuit in each phase winding of the motor.

For this purpose, the drive system according to the invention is able to take into account a wide variety of operating states and, by means of the specific production of a short circuit in the electric motor, to avoid the occurrence of potential hazards or potentially undesired consequential states. This can be illustrated, in particular, using characteristic curve B in FIG. 3, which shows the short-circuit braking torque as a function of the machine speed. It can be seen that, above all in the range of high speeds, the braking torque produced at short circuit is negligible, but is in every case considerably lower than the braking torque which is present when the electric motor is not short-circuited. This means that if, for example, a spontaneous failure of the field weakening occurs, then by means of the specific short-circuiting of the electric motor, on the one hand, the occurrence of an undesired braking torque can be considerably reduced, and on the other hand it is possible to prevent a voltage which may possibly be fed into the intermediate circuit by the electric motor leading to damage to components or to the voltage source, for example the traction battery.

The drive system according to the invention preferably comprises a primary drive arrangement supply voltage source for providing an operating voltage for the drive arrangement, preferably in the region of 12 V.

The above-mentioned predetermined operating state may be, for example, a fault state, which comprises at least one of the following faults:

a) a drop in, or failure of, the motor supply voltage,
b) faults in the area of a motor position sensor,
c) faults in the area of a current sensor for registering the current flowing in at least one phase winding,
d) short-circuit faults, in particular in the area of the motor, and
e) an intermediate-circuit voltage rising above a predetermined limiting value.

However, it should be pointed out here that any other fault which, in particular in the field-weakening range, leads to it being impossible to maintain the specific current flow through the motor, can be considered as a fault defining the predetermined operating state.

In the drive system according to the invention, each half-bridge arrangement comprises at least one first switch element for the selective connection of the associated phase winding of the electric motor to a motor supply voltage or, respectively, to a potential with a first polarity, as well as at least one second switch element for the selective connection of the associated phase winding of the electric motor to a motor supply voltage or, respectively, to a potential with a second polarity. In this embodiment, the command for producing the short circuit causes the at least one first switch element of each half-bridge arrangement to be switched on and/or the at least one second switch element of each half-bridge arrangement to be switched on.

There is, in principle, the problem that faults can also occur in the area of the half-bridge arrangements. For example, one of the switch elements may be defective and, on account of this defect, the desired current flow through the motor cannot be maintained. If, in consequence, a short circuit in the motor were to be brought about by all those switch elements being switched on which also include the defective and, for example, no longer conductive or no longer blocking switch element, then the occurrence of the undesired field e.m.f.s in the intermediate circuit could not be avoided or could not be completely avoided. In order to avoid this, it is proposed that the command for producing the short circuit has the effect that all the first and all the second switch elements are switched on, provided that the motor voltage source has previously already been isolated from the intermediate circuit. If this isolation of the battery from the intermediate circuit cannot be carried out, all the first switch elements or all the second switch elements are switched on. If, because of a defective switch element, the desired short-circuit effect does not occur, it is possible to change over to the respectively "complementary" switch elements.

Alternatively or additionally, however, it is also possible that the intermediate circuit has a switch arrangement which, in circuit terms, selectively connects the area with the first polarity and the area with the second polarity of the same, and that the command for producing the short circuit has the effect that the switch arrangement is switched on, provided that the motor voltage source has already been isolated from the intermediate circuit.

The drive arrangement according to the invention may comprise a normal drive section, by means of which, if the predetermined operating state is not present, each half-bridge arrangement can be driven to operate the electric motor, and where, at least if at least one of the faults a) to e) is present, the normal control section generates the command to produce the short circuit. This measure ensures that, without any increased outlay in terms of construction, a high measure of safety against the occurrence of undesired operating states can be provided.

The predetermined operating state may, furthermore, be a fault state, which comprises at least one of the following faults:

f) a failure of, or drop in, the drive arrangement supply voltage, and/or g) failure or faults in the area of a normal control section, by means of which, if the predetermined operating state is not present, each half-bridge arrangement can be driven to operate the electric motor.

In order to be able to react to such faults in a suitable way, it is proposed that the drive arrangement further comprises an anomalous drive section, which, at least if at least one of the faults a) to e) is present, generates the command to produce the short circuit.

In a configuration of this kind, in order to be independent with regard to the supply voltage for the anomalous drive section, the drive system according to the invention preferably comprises a DC/DC converter, assigned to the anomalous drive section, for producing an operating voltage for the anomalous drive section from the voltage prevailing in the intermediate circuit. That is to say that even a failure of the 12 V DC voltage supply for the normal drive section does not lead to complete failure of regulation. Instead, the anomalous drive section can take its operating voltage from the intermediate circuit, it being unimportant in this case whether the voltage prevailing in the intermediate circuit is supplied from a traction battery or a generator or is produced by the motor as a field e.m.f.

In order to be able to provide appropriate redundancy for other components in the drive arrangement as well, the drive system according to the invention preferably further comprises a secondary drive arrangement supply voltage source for providing the drive arrangement supply voltage, preferably in the region of 12 V, at least if the operating voltage provided by the primary drive arrangement supply voltage source fails or drops.

This voltage source may also be designed such that it comprises a DC/DC converter for producing the drive arrangement supply voltage from the voltage prevailing in the intermediate circuit. This means that even in the event of failure of the 12 V supply voltage for the drive arrangement, either the voltage produced in the intermediate circuit by the generator or the traction battery or the voltage produced in the intermediate circuit by the electric motor can be used to maintain the regulation of the electric motor as desired or, if appropriate, to control said electric motor down to a standstill.

Since there are risks for various components of such a motor drive system or drive system, above all at relatively high speeds, it is proposed that the drive arrangement is designed such that it generates the command to produce a short circuit if the predetermined operating state is registered and if, in addition, the electric motor is in a high-speed state.

Characteristic curve B in FIG. 3 reveals that, if the electric motor is short-circuited, a distinct rise in the braking torque is to be observed as the speed of the motor drops, there being a maximum close to speed 0. According to a further embodiment of the present invention, if the motor is at a standstill and is to remain in this state, this braking torque characteristic can be used to prevent the motor from being driven by the wheels. It is therefore also proposed that the predetermined operating state is a low-speed state of the electric motor, or a rest state of the electric motor. This means that if the short circuit is produced when the motor is at a standstill, the motor can be used actively as a braking device, since an extremely steep rise in braking torque is produced with just a slight rise in the rotational speed.

According to yet a further embodiment, the present invention relates to a drive system for a permanently excited electric motor having at least one phase winding, comprising a half-bridge arrangement for each phase winding of the motor; an intermediate circuit connecting each half-bridge arrangement to a motor supply voltage source; a drive arrangement for driving each half-bridge arrangement, wherein a voltage or a potential with a predetermined polarity is applied or can be applied for a predetermined duration by each half-bridge arrangement to that phase winding of the electric motor which is assigned to this half-bridge arrangement; a primary drive arrangement supply voltage source for providing an operating voltage for the drive arrangement, preferably in the region of 12 V; and a secondary drive arrangement supply voltage source for providing an operating voltage for the drive arrangement, preferably in the region of 12 V, and at least if the operating voltage provided by the primary drive arrangement supply voltage source fails or drops, wherein the secondary drive arrangement supply voltage source comprises a DC/DC converter for producing the drive arrangement supply voltage from the voltage prevailing in the intermediate circuit.

In a system of this type, a redundant voltage supply is provided, in particular for the drive arrangement, so that in the event of failure of the supply voltage provided by a conventional battery, care can be taken that the regulation of the motor is maintained, that is to say that the motor can continue to be operated in an unimpaired manner. Since the redundant voltage supply is based on the voltage prevailing in the intermediate circuit, there is no risk that a complete voltage failure for the drive arrangement will occur, since when the vehicle is travelling, a voltage is produced in the intermediate circuit either by the voltage source for the electric motor, that is to say the generator or the traction battery, or is produced by the motor itself by the induction present in the windings of the motor.

According to another embodiment, the present invention relates to a drive system for a permanently excited electric motor having at least one phase winding, comprising a half-bridge arrangement for each phase winding of the motor; an intermediate circuit connecting each half-bridge arrangement to a motor supply voltage source; a drive arrangement for driving each half-bridge arrangement, wherein, a voltage or a potential with a predetermined polarity is applied or can be applied for a predetermined duration by each half-bridge arrangement to that phase winding of the electric motor which is assigned to this half-bridge arrangement; and wherein the drive arrangement is designed such that, if the motor supply voltage drops or fails, said drive arrangement maintains any field weakening, supplied by the voltage induced by the motor, if desired in conjunction with at least one of the preceding features.

According to this embodiment of the present invention, care is taken that when a drop or failure occurs in the area of the supply voltage for the motor, the voltage which is produced by electromagnetic induction and rectification by the freewheeling diodes of the switching elements, which voltage is then present across the intermediate circuit, can be used in a positive way to maintain the field weakening and thus to avoid the occurrence of the above-mentioned overvoltages, together with the problems or disadvantages which result from this.

The present invention further relates to a method of driving a permanently excited electric motor having at least one phase winding, the method comprising the following steps:

1. monitoring the operating state of the electric motor and/or of a drive system for the electric motor;
2. assessing whether the operating state is a predetermined operating state; and
3. when the operating state is assessed to be a predetermined operating state, actively producing a short circuit between all the terminals of the electric motor.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

The invention will be described below using preferred embodiments and with reference to the appended drawings, in which.

DETAILED DESCRIPTION OF THE PRESENTLY PREFERRED EMBODIMENTS

Figure 1:
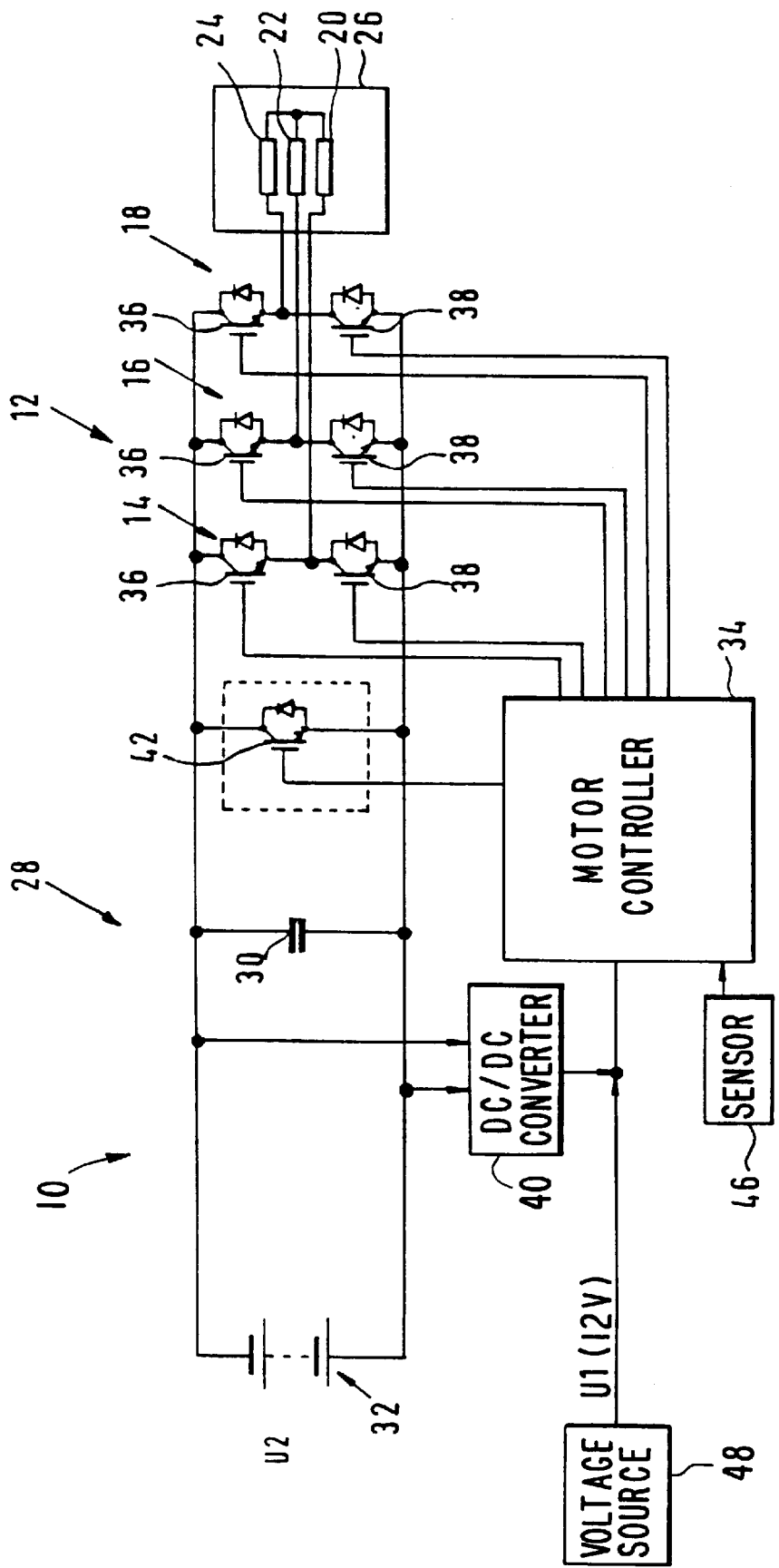
FIG. 1 is a schematic circuit diagram of a drive system according to an embodiment of the invention in conjunction with a three-phase, permanently excited electric motor.

FIG. 1 shows a first type of configuration of a drive system according to the invention, designated in general by 10. The drive system 10 may in principle be subdivided into the following subassemblies: a converter unit 12 with three half-bridges 14, 16, 18, each of the half-bridges 14, 16, 18 being assigned to one of the three motor phases 20, 22, 24 of the electric motor 26; an intermediate circuit 28 having an intermediate-circuit capacitor 30, the intermediate circuit 28 connecting the converter unit 12 to a voltage source 32. In the illustration, the voltage source 32 is a traction battery, if appropriate with power electronics, which supplies a DC voltage. However, it should be pointed out that, for example in hybrid drives as well, a generator driven by an internal combustion engine and having power electronics connected downstream may be used as the voltage source for the electric motor 26.

The motor controller 34 drives the converter unit 12, that is to say the respective half-bridges 14, 16, 18 of the same, via respective signal lines. In the embodiment illustrated, each half-bridge 14, 16, 18 comprises a first switch element 36, formed from an IGBT (insulated gate bipolar transistor) with a freewheeling diode connected in parallel, and a second switch element 38, which is likewise formed by an IGBT with a freewheeling diode connected in parallel. The individual IGBTs of the various half-bridges 14, 16, 18 are then driven by the motor controller 34 in order to connect the individual phase windings 20, 22, 24 of the electric motor 26 selectively and for predetermined time intervals to the various potentials of the intermediate circuit 28. It should be pointed out that for the present invention, the specific construction of the converter unit 12, that is to say of the individual half-bridges 14, 16, 18, does not have to be that illustrated in FIG. 1. It is possible for other switch elements, such as thyristors, relays, MOSFETs or the like, to be used. The important point is that they are designed for the voltages which occur in the drive system 10.

It can be seen, in addition, that the drive system 10 has a DC/DC converter 40, which picks off the voltage across the intermediate circuit 28 and converts this voltage into a desired DC voltage, for example 12 V. This DC voltage is led to the motor controller 34 in parallel with the voltage produced by the voltage source 48. A redundant voltage supply for the motor controller 34 is thus provided, so that, for example in the event of failure of the voltage source 48, the operating voltage required for the motor controller can be taken from the intermediate circuit, so that the driving or regulation of the electric motor can be maintained. This is also the case when, in addition to the voltage source 48, the voltage source 32 also fails, since in this case a voltage is produced on the intermediate circuit by the voltage induced in the electric motor 26 and the rectification via the freewheeling diodes, and this produced voltage produced can then continue to be converted into the operating voltage for the motor controller, in order to maintain the regulation of the motor 26 even in the event of complete failure of the voltage supply, especially when the motor 26 is being operated in the field-weakening area.

If a fault occurs in the area of the drive system 10, for example in the area of the electric motor 26 itself or in the area of the voltage source, then, according to the invention, a short circuit can nevertheless be produced by the motor controller 34 by either all the switch elements 36 or all the switch elements 38 or all the switch elements 36 and 38 being switched on. A short circuit is then produced within the electric motor 26. The consequence of this is that, for example in the event of failure of the drive system, the risk is avoided that the field e.m.f. generated in the motor is applied to the intermediate circuit and damages the components contained therein, (i.e., the components of the half-bridges 14, 16, 18 or the voltage source 32). In the case of modern permanently excited electric motors, these field e.m.f.s may lie considerably above the supply voltage provided by the voltage source 32. That is to say, in the event that this permissible voltage for the voltage source 32 is exceeded, there is the risk that if electrical energy is fed back, this voltage source 32 can be damaged by the rectified field e.m.f. The same is true of the switches 36 and 38. Here too, by means of short-circuiting, it is possible to avoid the voltage which is otherwise present on these switch elements leading to any damage to these switch components.

Since, according to the present invention, care is thus taken that any undesired voltage rise in the intermediate circuit 28 or the converter unit 12 is avoided, it is not necessary to design the various switching elements or sub-assemblies such that the maximum voltages otherwise to be expected cannot lead to damage to the same, even in the event of faulty operation. This means that there is the possibility of achieving considerable cost savings, in particular in the area of the semiconductor components. On the other hand, it is possible to configure the various components of the electric motor such that said motor can produce the greatest possible output, given a predetermined volume, and without attention having to be paid, as far as the circuit is concerned, to there being an excessively great safety margin of the respective rated voltages of various components in relation to the maximum voltages to be expected, i.e., including voltages to be expected in the fault state.

The above-mentioned fault state may occur in various areas of the drive system. Thus, for example, the position transmitter for the rotor of the motor may be defective, so that correct current flow through the latter is no longer possible; the current sensor or the current sensors which register the currents flowing in the individual motor phase windings 20, 22, 24 may be defective; there may be a short-circuit fault in the motor itself; or, as mentioned above, there may be a failure or drop in the voltage provided by the voltage source 32. It should be pointed out that an extremely wide range of other faults may also lead to the active production of a short circuit.

In FIG. 1 it is possible to see, drawn with dashed lines, a further switch element 42, which is connected in parallel with the switches 36 and 38 of the half-bridge converter unit 12. This switch element 42 may also again comprise, for example, an IGBT and a series resistor, but may also comprise any other power switch element or may be formed by the latter. The switch element 42 is also driven by the motor controller 34. The above-mentioned short circuit, as an alternative to the way mentioned above, can also be caused by switching this switch element 42 on, the short circuit then being produced by the individual freewheeling diodes. However, this type of short-circuit production is preferred, as is the simultaneous switching on of all the switch elements 36 and 38, only when it is ensured that there is a complete or virtually complete voltage drop or failure of the voltage source 32. Otherwise, a short circuit of the voltage source 32, with a corresponding current flow, is simultaneously produced in this way. Furthermore, it would also be possible here to provide a switch element in the intermediate circuit 28 between the switch element 42 and the voltage source 32, said switch element being switched off when the switch element 42 is switched on, so that the short circuit is produced only on the right-hand side of the switch element 42 in the illustration of FIG. 1, that is to say in the area of the motor 26.

Figure 2:
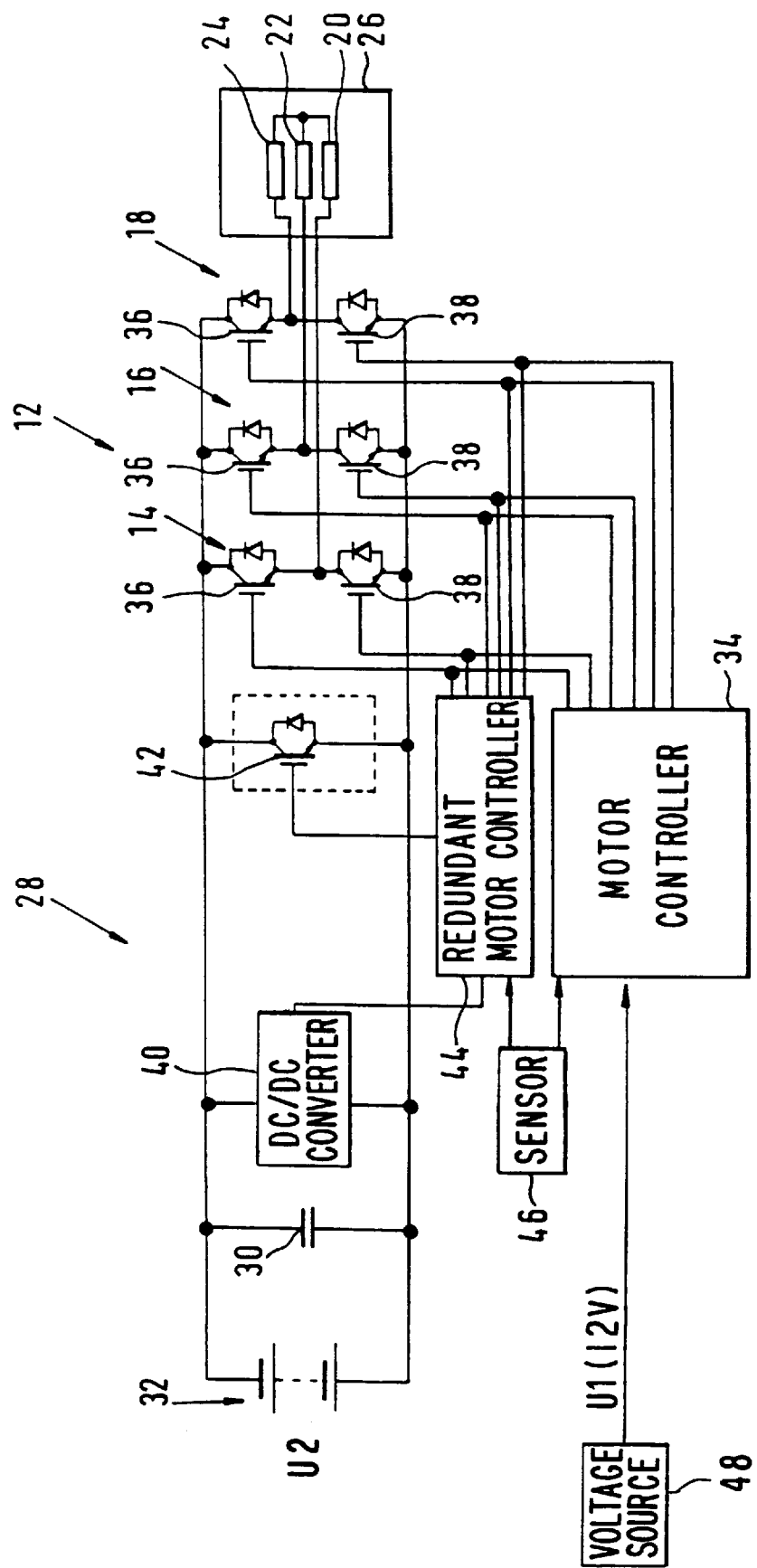
FIG. 2 is a schematic diagram of an alternative configuration of the drive system shown in FIG. 1; in accordance with the invention.

FIG. 2 shows an alternative embodiment, in which, in addition to the motor controller 34, a further, redundant motor controller 44 is provided, which, via respective control lines, can likewise drive the individual switch elements 36 or 38 of the half-bridges 14, 16, 18 and, if provided, the switch element 42. The redundant drive means 44 obtains its operating voltage via the DC/DC converter 40, which in turn picks off the voltage on the intermediate circuit 28. This redundant drive means is thus independent of the supply voltage which is supplied by the voltage source 48, so that the redundant drive means 44 can be operated even in the event of failure of the voltage source 48.

The development illustrated in FIG. 2 is particularly advantageous since, using this development, even faults in the area of the motor controller 34 itself can be taken into account, and can lead to the production of the short circuit. Although this embodiment is more complicated in terms of circuitry or software, it provides an expanded range in which the safety measures can be used.

It should be pointed out that in both the embodiments shown in FIGS. 1 and 2, as already mentioned, various devices are provided which register or monitor the fault state or various operating states of the drive system or of the overall motor drive system, and supply corresponding signals to the motor controller 34 and/or to the redundant drive means 44. These devices are designated generally by 46 in the figures and may comprise the sensors already mentioned or may, for example, also comprise sensors which monitor the output signals from the motor controller or monitor the motor controller internally. Furthermore, by means of the device or devices 46, the voltage sources 48, 32, the DC/DC converter 40 or the various switch elements can be monitored. Depending on the output signal or the output signals from the device or devices 46, a decision can be made in the motor controller 34 or the redundant drive means 44 as to whether and in what manner the short circuit is to be produced, that is to say, for example, whether all the switch elements 36, 38 are to be short-circuited, whether only the switch elements 36 or 38 assigned to the various polarities of the intermediate circuit are to be switched on, or whether, if present, the switch element 42 is to be switched on.

The devices 46 may also be designed for the purpose of monitoring the voltage present in the intermediate circuit 28. If this voltage exceeds a predetermined value, which may be in the range from 400 to 600 V, for example, the command to produce the short circuit can be generated by the motor controller 34 or the redundant drive means 44, as described above. Once the voltage has fallen below a second, lower threshold value again, the short circuit can be cancelled.

Figure 3:
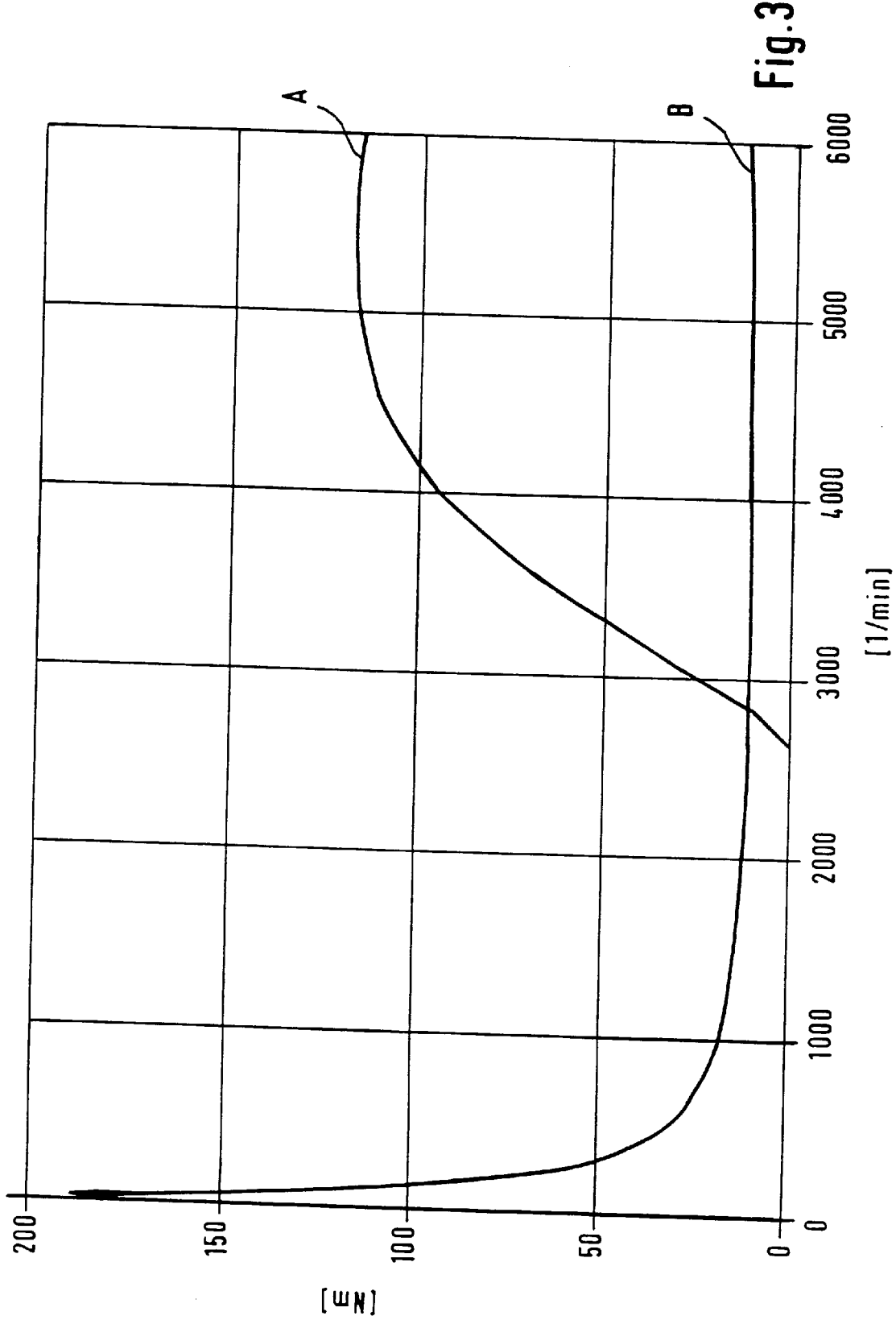
FIG. 3 is a graphical representation of the braking torque produced in a permanently excited electric motor as a function of the motor speed, with a short-circuited electric motor and with a regenerating electric motor.

In the drive system according to the invention, use can further be made of characteristic curve B in FIG. 3 to bring about the fixing of the rotor when the motor is at a standstill by switching on various switch elements 36 and/or 38 and 42. This is because, when the motor is at a standstill, if all the switch elements 36 are switched on, for example, and a short circuit is thus produced in the motor 26, just slight rotation of the rotor then leads to an extremely sharp rise in the braking torque, so that, for example, the undesired rolling away of a vehicle can be counteracted. This is a further independent aspect of the use of the drive arrangement according to the invention, which shows that an operating state which ultimately leads to the production of a short circuit may be not only a fault state but also a state which often occurs during normal operation and which occurs without the presence of faults.

A further embodiment of the invention, which has already been mentioned, resides in the fact that, for example in the event of failure of the voltage source 32, the motor controller 34 can maintain the field weakening for the electric motor 26 as a result of the redundant voltage supply by means of the DC/DC converter, in order to avoid the occurrence of undesired voltage spikes in the intermediate circuit or in the converter unit, without a short circuit being produced. In this case, the operating voltage for the motor controller 34 is then taken from the intermediate circuit 28, and is in turn produced there by the electric motor 26 itself. It should be pointed out that even if the redundant drive means 44 is present, the motor controller 34 can be supplied by the DC/DC converter 40 in the event of a failure of the voltage source 48, so that if the motor controller 34 is serviceable. The driving of the individual switch elements 36, 38 (FIG. 2) continues to be performed by this motor controller 34 and not by the redundant drive means 44.

In addition, it is pointed out that the registration of faults can also be performed within the motor controller 34 or 44 itself, that is to say this controller may be designed, for example in software terms, to monitor itself and, when faults are detected, can generate the appropriate drive command to produce the short circuits in the individual motor phase windings. Furthermore, it should be pointed out that the drive system according to the invention and, respectively, the procedure for driving various switch elements, can be used irrespective of the number of motor phases. This means that the drive system can be used not only in the three-phase motor illustrated in the figures but also in motors having more or fewer phase windings.

The invention is not limited by the embodiments described above which are presented as examples only but can be modified in various ways within the scope of protection defined by the appended patent claims.

We claim:

1. A drive system for a permanently excited electric motor having at least one phase winding, the drive system comprising:
at least one half-bridge arrangement for each of said at least one phase winding of the electric motor;
an intermediate circuit connecting each half-bridge arrangement to a motor supply voltage source;
a drive arrangement for driving each of said at least one half-bridge arrangement to apply a voltage having a predetermined polarity to each of said at least one phase winding assigned to a respective one of said at least one half-bridge arrangement for a predetermined period of time; and
an operating state registering arrangement for registering at least one operating state of the drive system and electric motor, said drive arrangement generating a command to produce a short circuit between each of the at least one phase winding of the motor in response to the presence of at least one predetermined operating state registered by said operating state registering arrangement, wherein each of said at least one half-bridge arrangements comprises at least one first switch element for selectively connecting the associated at least one phase winding of the electric motor with a motor supply voltage having a first polarity and at least one second switch element for selectively connecting the associated at least one phase winding of the electric motor with the motor supply voltage having a second polarity, wherein the generated command for producing a short circuit causes all switch elements of said at least one first and said at least one second switch elements of each of said at least one half-bridge arrangements to be switched on.

2. The drive system in accordance with claim 1, further comprising a switch arrangement arranged in said intermediate circuit and which connects an area with the first polarity and an area with the second polarity, said generated command for producing a short circuit causing said switch arrangement to be switched on.

3. A drive system for a permanently excited electric motor having at least one phase winding, the drive system comprising:
at least one half-bridge arrangement for each of said at least one phase winding of the electric motor;
an intermediate circuit connecting each half-bridge arrangement to a motor supply voltage source;
a drive arrangement for driving each of said at least one half-bridge arrangement to apply a voltage having a predetermined polarity to each of said at least one phase winding assigned to a respective one of said at least one half-bridge arrangement for a predetermined period of time;
a primary supply voltage source for providing an operating voltage to said drive arrangement in a region of 12 volts; and
an operating state registering arrangement for registering at least one operating state of the drive system and electric motor, said drive arrangement generating a command to produce a short circuit between each of the at least one phase winding of the motor in response to the presence of at least one predetermined operating state registered by said operating state registering arrangement, wherein said at least one predetermined operating state is a fault state comprising one from a group consisting of:
(a) a drop in a motor supply voltage supplied by the motor supply voltage source;
(b) a failure in the motor supply voltage source;
(c) faults in an area of a motor position sensor;
(d) faults in an area of a current sensor for registering a current flowing in said at least one phase winding;
(e) short-circuit faults in an area of the electric motor;
(f) an intermediate circuit voltage rising above a predetermined value;
(g) a failure of the primary supply voltage source;
(h) a drop in the primary supply voltage source;
(i) a failure of a normal controller by means of which when the predetermined operating state is not present, said at least one half-bridge arrangement can be driven to operate the electric motor; and (j) a fault in said normal controller by means of which when the predetermined operating state is not present, said at least one half-bridge arrangement can be driven to operate the electric motor, wherein said drive arrangement comprises said normal controller for generating the command to produce a short circuit in response to the presence of at least one of the faults (a)–(f) and enabling each of said at least one half-bridge arrangement to be driven to operate the electric motor in the absence of the predetermined operating state and wherein said drive arrangement further comprises an anomalous controller for generating the command to produce the short circuit in the presence of at least one of said fault states (a)–(j).

4. The drive system in accordance with claim 3, further comprising a DC/DC converter connected to said anomalous controller for producing an operating voltage for the anomalous controller from a voltage prevailing in said intermediate circuit.

5. A drive system for a permanently excited electric motor having at least one phase winding, the drive system comprising:

at least one half-bridge arrangement for each of said at least one phase winding of the electric motor;

an intermediate circuit connecting each half-bridge arrangement to a motor supply voltage source;

a drive arrangement for driving each of said at least one half-bridge arrangement to apply a voltage having a predetermined polarity to each of said at least one phase winding assigned to a respective one of said at least one half-bridge arrangement for a predetermined period of time;

a primary supply voltage source connected to said drive arrangement; and an operating state registering arrangement for registering at least one operating state of the drive system and electric motor, said drive arrangement generating a command to produce a short circuit between each of the at least one phase winding of the motor in response to the presence of at least one predetermined operating state registered by said operating state registering arrangement; and a secondary supply voltage source for providing the drive arrangement supply voltage when the primary supply voltage source fails.

6. A drive system for a permanently excited electric motor having at least one phase winding, the drive system comprising:

at least one half-bridge arrangement for each of said at least one phase winding of the electric motor;

an intermediate circuit connecting each half-bridge arrangement to a motor supply voltage source;

a drive arrangement for driving each of said at least one half-bridge arrangement to apply a voltage having a predetermined polarity to each of said at least one phase winding assigned to a respective one of said at least one half-bridge arrangement for a predetermined period of time; and an operating state registering arrangement for registering at least one operating state of the drive system and electric motor, said drive arrangement generating a command to produce a short circuit between each of the at least one phase winding of the motor in response to the presence of at least one predetermined operating state registered by said operating state registering arrangement; and a secondary supply voltage source for providing the drive arrangement supply voltage when the primary supply voltage source fails, wherein said secondary supply voltage source comprises a DC/DC converter for producing the drive arrangement supply voltage from a prevailing voltage in said intermediate circuit.

7. A drive system for a permanently excited electric motor having at least one phase winding, the drive system comprising:

at least one half-bridge arrangement for each of said at least one phase winding of the electric motor;

an intermediate circuit connecting each half-bridge arrangement to a motor supply voltage source;

a drive arrangement for driving each of said at least one half-bridge arrangement to apply a voltage having a predetermined polarity to each of said at least one phase winding assigned to a respective one of said at least one half-bridge arrangement for a predetermined period of time;

a primary supply voltage source for providing an operating voltage for the drive arrangement in a region of 12 volts; and a secondary supply voltage source for providing an operating voltage for said drive arrangement in a region of 12 volts when said primary supply voltage source fails to provide a predetermined operating voltage to said drive arrangement, said secondary supply voltage source comprising a DC/DC converter for producing the operating voltage from a voltage prevailing in the intermediate circuit.

* * * * *